United States Patent [19]
Cheng

[11] Patent Number: 6,101,666
[45] Date of Patent: Aug. 15, 2000

[54] WORKBENCH WITH AIR FILTRATION CAPABILITY

[76] Inventor: Meng-Chieh Cheng, No. 169, Chung-Shan Rd., Fengyuan City, Taiwan

[21] Appl. No.: 09/298,529

[22] Filed: Apr. 23, 1999

[51] Int. Cl.[7] .......................................... A47L 5/38
[52] U.S. Cl. .................. 15/301; 15/303; 15/310
[58] Field of Search ............................. 15/301, 303, 310

[56] References Cited

U.S. PATENT DOCUMENTS

| | | | |
|---|---|---|---|
| 3,411,174 | 11/1968 | Jordan | 15/310 |
| 3,624,859 | 12/1971 | Folke | 15/310 X |
| 4,594,747 | 6/1986 | Dempsey | 15/301 |
| 4,647,295 | 3/1987 | Christ | 15/301 X |
| 5,271,123 | 12/1993 | Teske | 15/310 |
| 5,276,938 | 1/1994 | Cadwell et al. | 15/310 X |

*Primary Examiner*—Chris K. Moore
*Attorney, Agent, or Firm*—Brinks Hofer Gilson & Lione

[57] ABSTRACT

A workbench includes a hollow base member formed with a lower chamber and an upper chamber that is disposed above and in fluid communication with the lower chamber. A tabletop is mounted on top of the base member and is formed with a plurality of apertures for access into the upper chamber. An air filtering device is mounted in the upper chamber. A motor-operated suction device is mounted in the lower chamber and is operable to create a downward air stream for drawing air to flow in a direction from above the tabletop into the base member such that woodworking waste on the tabletop can be drawn into the base member via the apertures so as to be entrapped by the air filtering device.

11 Claims, 5 Drawing Sheets

6,101,666

WORKBENCH WITH AIR FILTRATION CAPABILITY

FIELD OF THE INVENTION

The invention relates to a workbench, more particularly to a workbench for woodworking and that has an air filtration capability for collecting waste resulting from woodworking, such planing, sanding and sawing operations.

BACKGROUND OF THE INVENTION

Referring to FIG. 1, a conventional workbench 1 for use in woodworking is shown to include an outer housing (1c) connected fluidly to a suction device 2 via a connecting pipe (2b), and a tabletop (1a) disposed on top of the outer housing (1c) for supporting a work-piece thereon such that sawing or sanding can be conducted on the work-piece. The tabletop (1a) includes an upper mesh layer and a lower perforated frame layer (1b). Upon operation of the suction device 2, a downward air stream will flow in a direction from above the tabletop (1a) toward the suction device 2 so as to collect the woodworking waste in a waste collecting bag (2a).

Because the suction device 2 is separately disposed relative to the housing (1c), the workbench 1 occupies a relatively large amount of space.

SUMMARY OF THE INVENTION

The main object of this invention is to provide a woodworking workbench that has air filtration capability and that is compact to facilitate storage and transport thereof.

Accordingly, the workbench of the present invention includes a hollow base member, a tabletop, an air filtering device, and a motor-operated suction device. The base member is formed with a lower chamber and an upper chamber that is disposed above and in fluid communication with the lower chamber. The tabletop is mounted on top of the base member and is formed with a plurality of apertures for access into the upper chamber. The air filtering device is mounted in the upper chamber. The suction device is mounted in the lower chamber and is operable to create a downward air stream for drawing air to flow in a direction from above the tabletop into the base member such that woodworking waste on the tabletop can be drawn into the base member via the apertures so as to be entrapped by the air filtering device.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
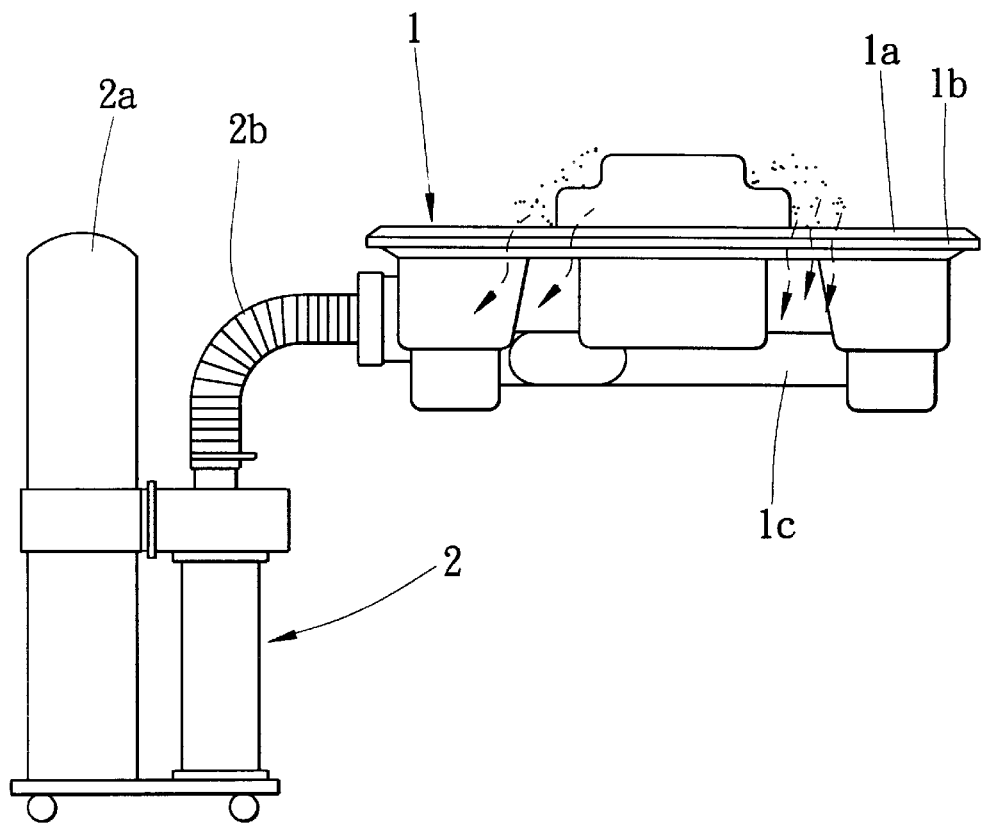
FIG. 1 is a schematic view of a conventional workbench for woodworking and connected to a suction device via a connecting pipe.
Figure 2:
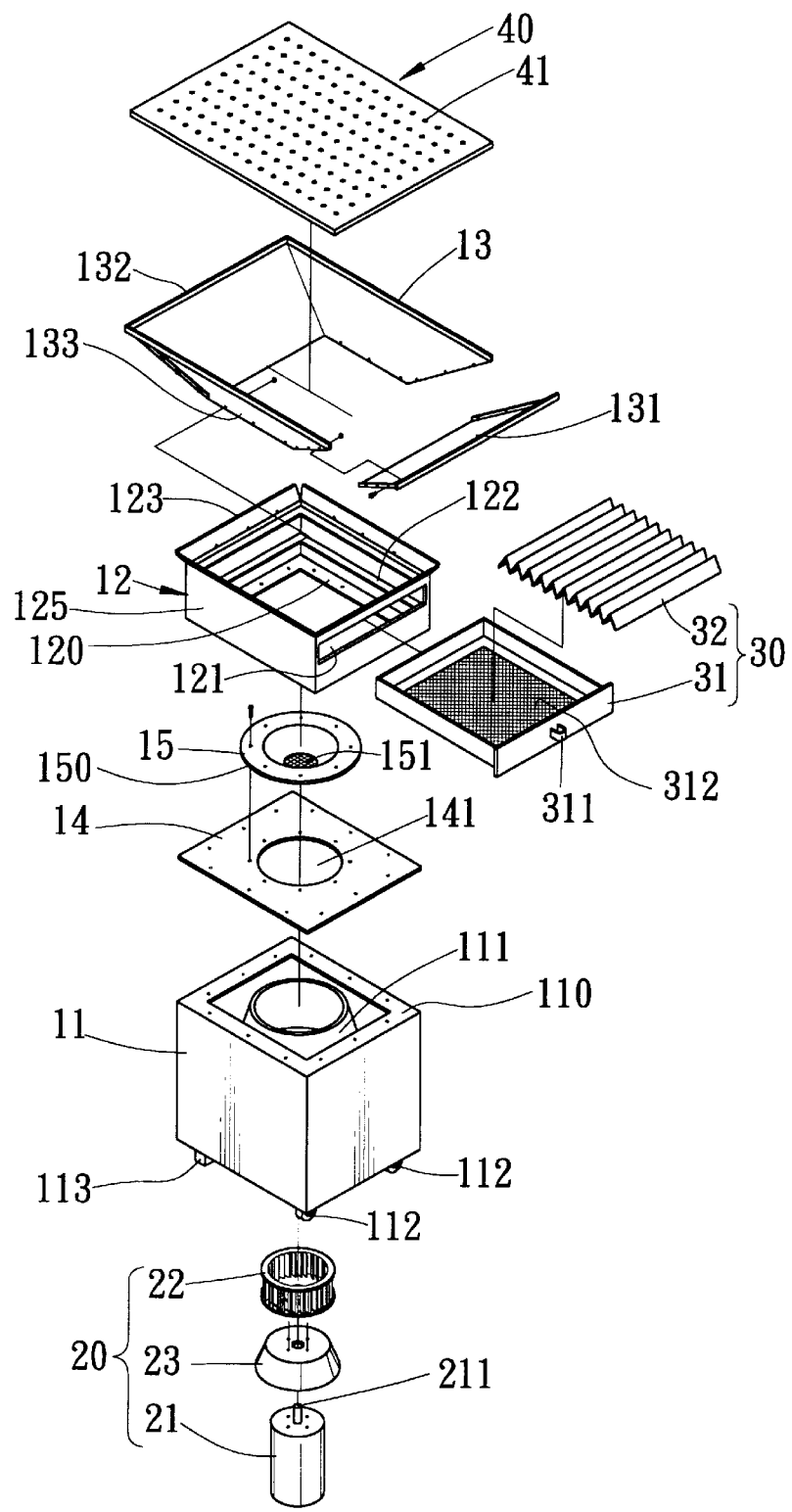
FIG. 2 is an exploded view of the preferred embodiment of a workbench of the present invention.
Figure 3:
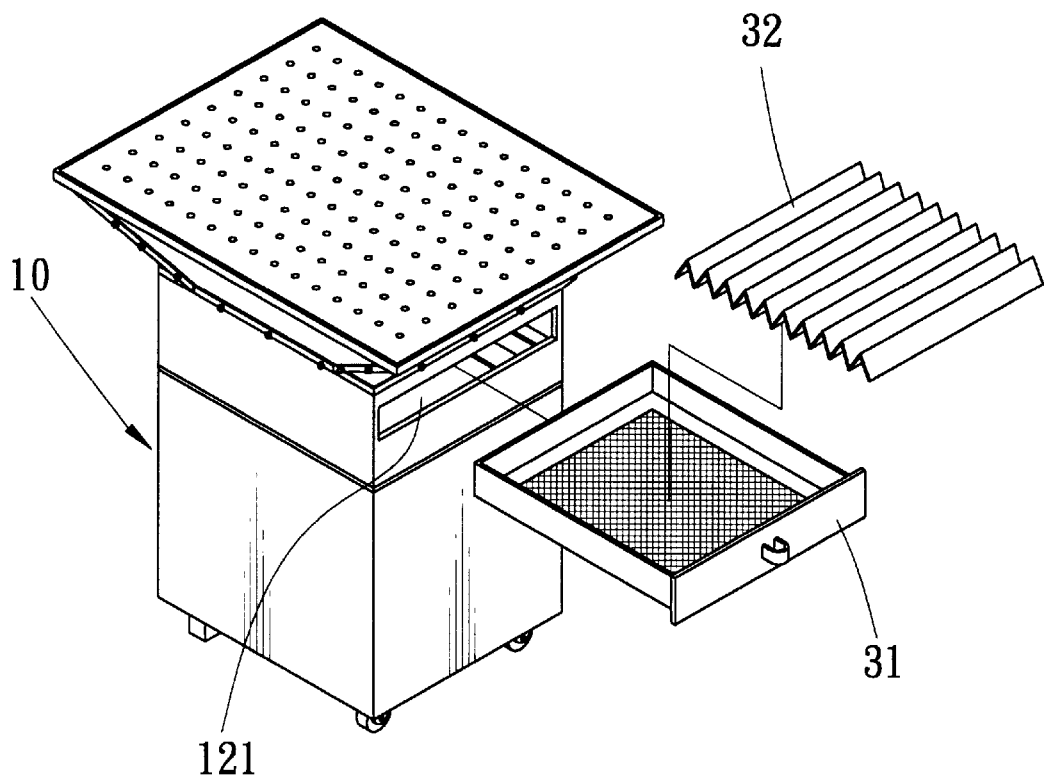
FIG. 3 is a partly exploded view of the preferred embodiment.
Figure 4:
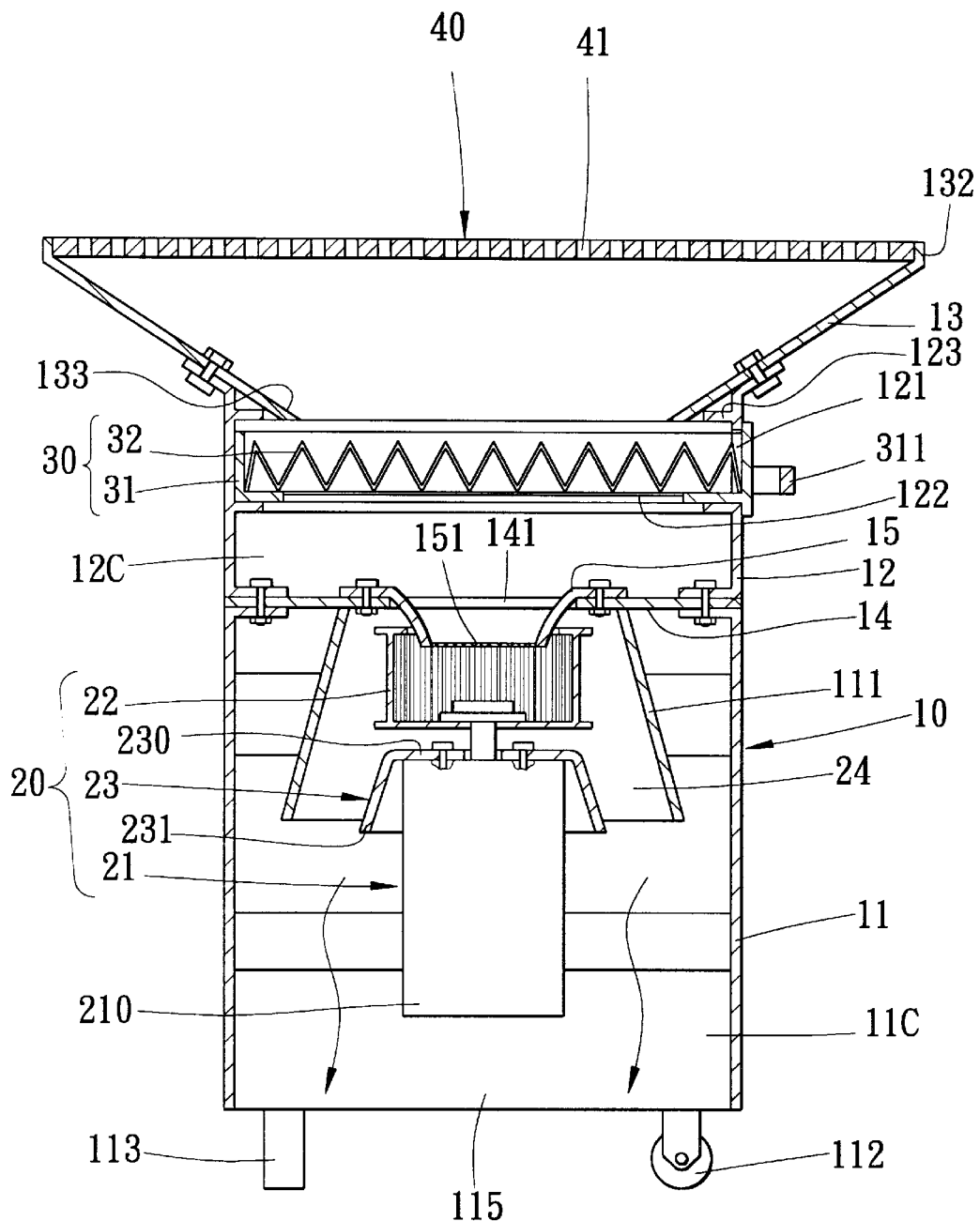
FIG. 4 is a sectional view of the preferred embodiment.

Referring to FIGS. 2, 3 and 4, the preferred embodiment of a workbench according to the present invention is shown to include a hollow base member 10, a tabletop 40, an air filtering device 30, and a motor-operated suction device 20.

As illustrated, the base member 10 includes a hollow lower frame body 11 that confines a lower chamber (11C) with an open top end 110 (see FIG. 4), a hollow upper frame body 12 that is mounted on top of the lower frame body 11 and that confines an upper chamber (12C) with an open bottom end 120, and a partition plate 14 mounted between the open top end 110 of the lower frame body 11 and the open bottom end 120 of the upper frame body 12. The partition plate 14 is formed with a central opening 141 which communicates fluidly the upper and lower chambers (11C, 12C). The upper frame body 12 further has an open top end 123 for access into the upper chamber (12C). The lower frame body 11 has an open bottom end that serves as a vent outlet 115 (see FIG. 4), a pair of casters 112 at one side of the bottom end, and a pair of upright legs 113 at the other side of the bottom end such that when it is desired to move the base member 10, the base member 10 can be tilted about the casters 112 and lift the legs 112 from the ground.

The base member 10 further includes a hopper 13 which has a wider top end 132 and a narrow bottom end 133 opposite to the wider top end 132 and narrower than the wider top end 132. The narrow bottom end 133 of the hopper 13 is mounted on the open top end 123 of the upper frame body 12 via screws. The hopper 13 is preferably formed from four trapezoid partitions 131 which are fastened together by means of screws.

The tabletop 40 is mounted on the wider open end 132 of the hopper 13, and has a plurality of apertures 41 for access into the upper chamber (12C).

The upper frame body 12 has a surrounding wall formed by fastening together two pairs of side walls 125 with the use of screws. One pair of the side walls 125 defines a set of slide rails 122 on inner surfaces thereof. One of the side walls 125 in the other pair is formed with an elongated opening 121.

The air filtering device 20 is mounted in the upper chamber (12C) confined by the upper frame body 12, and includes a rectangular mounting frame 31 engaging slidably the rails 122 so as to be received in the upper chamber (12C) via the opening 121. The mounting frame 31 has an open top side and an open bottom side provided with a mesh layer 312 to receive a filter board 32 of a corrugated cross-section. The mounting frame 31 is provided with a handle 311 to facilitate drawing of the same outwardly of the upper chamber (12C). The filter board 32 is preferably made from a non-woven fabric material.

In the preferred embodiment, the suction device 20 is mounted in the lower chamber (11C), and includes a motor 21 with a motor housing 210, an annular air impeller 22, and an auxiliary filter member 15. A drive shaft 211 extends outwardly from the housing 210 toward the partition plate 14. The air impeller 22 has a top side and a bottom side connected to the drive shaft 211 so as to be driven rotatably by the motor 21. The auxiliary filter member 15 is bowl-shaped, and has a peripheral portion 150 that is mounted on the partition plate 14 with the use of screws, and a perforated central portion 151 that extends downwardly through the central opening 141 of the partition plate 14 toward the top side of the air impeller 22.

The preferred embodiment further includes an annular outer air guide 111 that has an open bottom side and an open top side attached to the partition plate 14 around the central opening 141, and an inner air guide 23 that has a planar top wall 230 disposed below the bottom side of the air impeller 22 and fastened on the housing 210 by the use of screws. An annular skirt 231 extend downwardly from the periphery of the planar top wall 230. The outer air guide 11 and the annular skirt 231 cooperate to define an air channel 24 therebetween. The air channel 24 diverges in a direction away from the partition plate 14.

Figure 5:
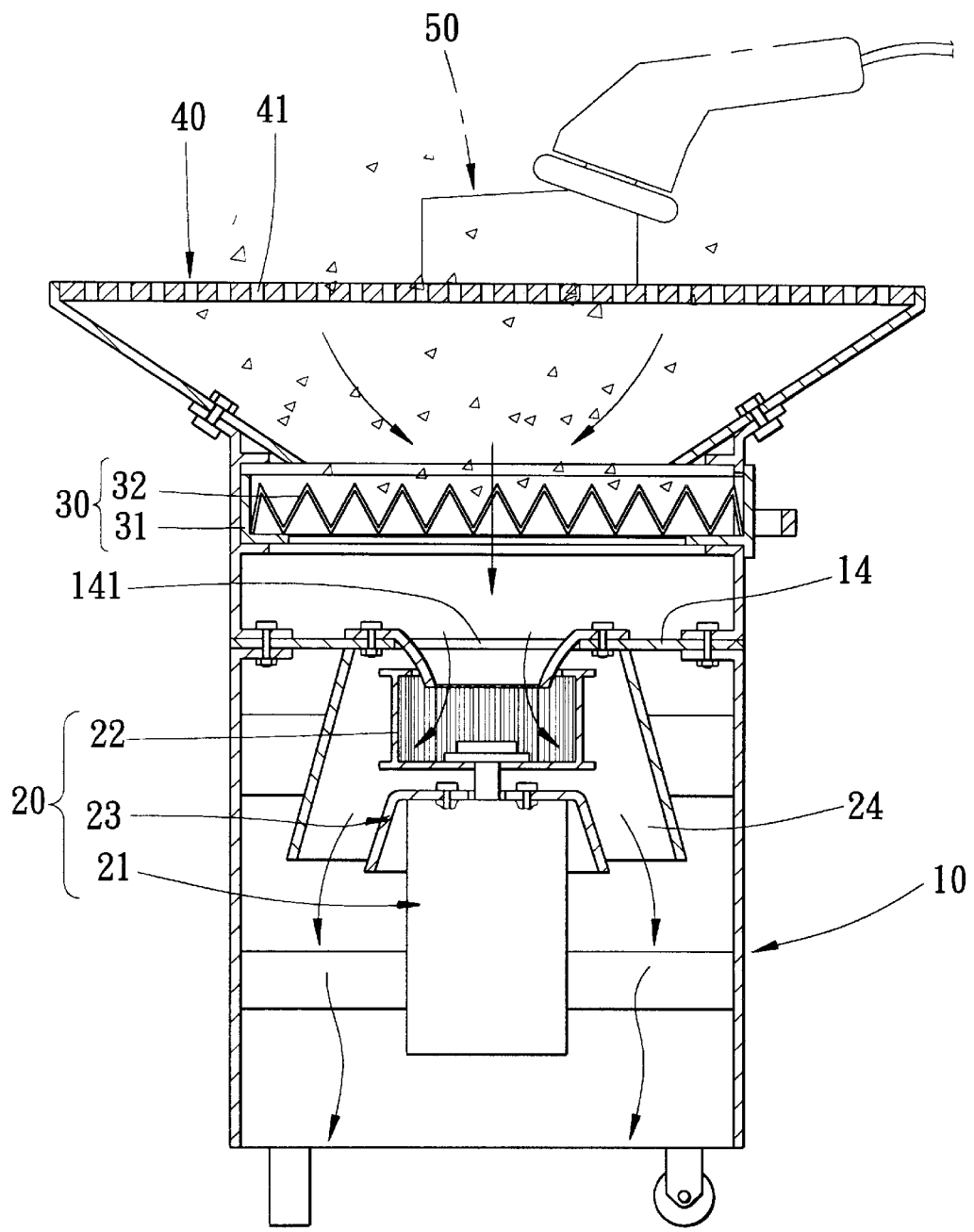
FIG. 5 illustrates the preferred embodiment in a state of use.

Referring to FIG. 5, in case a planing operation is conducted on a work-piece 50 disposed on the tabletop 40, the motor 21 is operated to create a downward air stream for drawing air to flow in a direction from above the tabletop 40 into the base member 10 such that woodworking waste that results from the planing operation can be drawn into the base member 10 via the apertures 41. The woodworking waste will be entrapped by the filter board 32 so as to filter the air that flows from the upper chamber (12C) to the lower chamber (12C). After a period of use, the mounting frame 31 can be drawn outwardly from the upper chamber (12C) in order to remove the collected woodworking waste.

The advantages achieved from the use of the workbench of the present invention are as follows:

(1) Because the filtering device 30 and the suction device 20 are disposed in the base member 10, the amount of space occupied by the workbench is relatively small.

(2) After removal of the filtering device 30 and the suction device 20, the base member 10 can be dismantled to facilitate transport and storage.

(3) The vent outlet 115 is disposed close to the ground surface so as to further minimize exposure of the operator to waste-laden air.

With this invention thus explained, it is apparent that numerous modifications and variations can be made without departing from the scope and spirit of this invention. It is therefore intended that this invention be limited only as indicated in the appended claims.

I claim:

1. A workbench comprising:
   a hollow base member formed with a lower chamber and an upper chamber disposed above and in fluid communication with said lower chamber;
   a tabletop mounted on top of said base member and formed with a plurality of apertures for access into said upper chamber;
   an air filtering device mounted in said upper chamber; and
   a motor-powered suction device mounted in said lower chamber and operable so as to create a downward air stream for drawing air to flow in a direction from above said tabletop into said base member such that woodworking waste on said tabletop can be drawn into said base member via said apertures so as to be entrapped by said air filtering device, thereby filtering the air that flows from said upper chamber to said lower chamber of said base member.

2. The workbench as defined in claim 1, wherein said base member includes:
   a hollow lower frame body that confines said lower chamber and that has an open top end for access into said lower chamber;
   a hollow upper frame body that is mounted on top of said lower frame body and that confines said upper chamber, said upper frame body having an open bottom end; and
   a partition plate mounted between said open top end of said lower frame body and said open bottom end of said upper frame body, and formed with a central opening to intercommunicate fluidly said upper and lower chambers.

3. The workbench as defined in claim 2, wherein said upper frame body further has an open top end for access into said upper chamber, said base member further including a hopper having a wider top end and a narrow bottom end opposite to said wider top end, said narrow bottom end being mounted on said open top end of said upper frame body, said tabletop being mounted on said wider top end of said hopper.

4. The workbench as defined in claim 2, wherein said upper frame body has a surrounding wall formed with an elongated opening, said air filtering device including:
   a mounting frame mounted on said surrounding wall and extending slidably into said upper chamber via said elongated opening, said mounting frame having an open top side and an open bottom side provided with a mesh layer thereon; and
   a filter board disposed in said mounting frame on top of said mesh layer.

5. The workbench as claimed in claim 4, wherein said filter board has a corrugated cross-section and is made from a non-woven fabric material.

6. The workbench as claimed in claim 2, wherein said mounting frame is provided with a handle to facilitate drawing of said mounting frame outwardly of said upper chamber.

7. The workbench as claimed in claim 2, wherein said suction device includes:
   a motor having a housing and a drive shaft that extends from said housing; and
   an annular air impeller having a top side and a bottom side connected to said drive shaft such that said air impeller is driven rotatably by said motor.

8. The workbench as claimed in claim 7, wherein said suction device further includes:
   an annular outer air guide having an open top side and an open bottom side, said open top side of said outer air guide being mounted on said partition plate around said central opening, said drive shaft of said motor and said air impeller being disposed inside said outer air guide; and
   an inner air guide having a planar top wall disposed below said bottom side of said air impeller and mounted on said housing of said motor, and an annular skirt extending downwardly from a periphery of said planar top wall;
   said outer air guide and said annular skirt diverging in a direction away from said partition plate and cooperating to confine an air channel therebetween.

9. The workbench as claimed in claim 8, wherein said lower frame body has an open bottom end that serves as a vent outlet.

10. The workbench as claimed in claim 7, further comprising an auxiliary filter member having a peripheral portion that is mounted on said partition plate, and a perforated central portion that extends through said central opening in said partition plate toward said top side of said air impeller.

11. The workbench as claimed in claim 2, wherein said lower frame body has a bottom end with one side provided with a pair of casters, and an opposite side provided with a pair of upright legs to support said bottom end of said lower frame body spacedly from a ground surface.

* * * * *